(12) United States Patent
Kulkarni et al.

(10) Patent No.: US 9,008,575 B2
(45) Date of Patent: Apr. 14, 2015

(54) PORTABLE MOBILE COMMUNICATION DEVICE AND METHOD OF CONTROLLING NEAR FIELD COMMUNICATION

(75) Inventors: Giten Kulkarni, Bangalore (IN); Ravindra Upadhyaya, Bangalore (IN); Jeremy Geslin, St Aubin sur Mer (FR)

(73) Assignee: NXP B.V., Eindhoven (NL)

( * ) Notice: Subject to any disclaimer, the term of this patent is extended or adjusted under 35 U.S.C. 154(b) by 975 days.

(21) Appl. No.: 13/133,566

(22) PCT Filed: Nov. 18, 2009

(86) PCT No.: PCT/IB2009/055135
§ 371 (c)(1),
(2), (4) Date: Jun. 8, 2011

(87) PCT Pub. No.: WO2010/067222
PCT Pub. Date: Jun. 17, 2010

(65) Prior Publication Data
US 2011/0244797 A1  Oct. 6, 2011

(30) Foreign Application Priority Data

Dec. 12, 2008  (EP) .................................... 08291173

(51) Int. Cl.
*H04B 5/00* (2006.01)
*H04L 29/08* (2006.01)
(Continued)

(52) U.S. Cl.
CPC .............. *H04L 67/14* (2013.01); *H04L 67/146* (2013.01); *H04W 24/00* (2013.01); *H04W 76/02* (2013.01); *H04W 76/021* (2013.01); *H04W 84/10* (2013.01); *H04W 88/02* (2013.01)

(58) Field of Classification Search
CPC .......................... G06K 19/0723; H04W 84/18
USPC ........................................................ 455/41.1
See application file for complete search history.

(56) References Cited

U.S. PATENT DOCUMENTS 5,898,783 A * 4/1999 Rohrbach .................... 340/5.31
8,060,012 B2 * 11/2011 Sklovsky et al. ............ 455/41.1
(Continued)

FOREIGN PATENT DOCUMENTS

CN        201146522 Y    11/2008
WO      2007/052994 A1    5/2007

OTHER PUBLICATIONS

ETSI TS 102 622 (V7.0.0-2008-02), Smart Cards; UICC—Contactless Front-end (CLF) Interface; Host Controller Interface (HCI), Release 7, ETSI Standard, European Telecommunications Standards Institute (ETSI)Sophia Antipolis Cedex, France, vol. SCP-T, No. V7.2.0, Sep. 1, 2008, XP014042358, section 7.1.1.1 and section 8.4.*

(Continued)

*Primary Examiner* — Hai V Nguyen

(57) ABSTRACT

A portable mobile communication device (10) has a mobile host processor (104) permanently installed in the portable mobile communication device (10) and a near field communication circuit (100) comprising a non-volatile memory (101). Configuration data is maintained in the non-volatile memory (101) of the near field communication circuit (100), for control of communication dependent on the configuration data. Prior to communication between the near field communication circuit (100) and the mobile host processor (104) a session identity value is tested. If the session identity value does not match a reference value, at least part of the configuration data for the communication channel is initialized, after which the session identity value and the reference value are equalized after setting up the configuration data. If the session identity value matches the reference value, the mobile host processor (104) proceeds with communication without said initialization. In this way wear of the non-volatile memory due to superfluous initialization after unintentional power downs or resets of the mobile host processor (104) is prevented.

14 Claims, 2 Drawing Sheets

Figure 1:
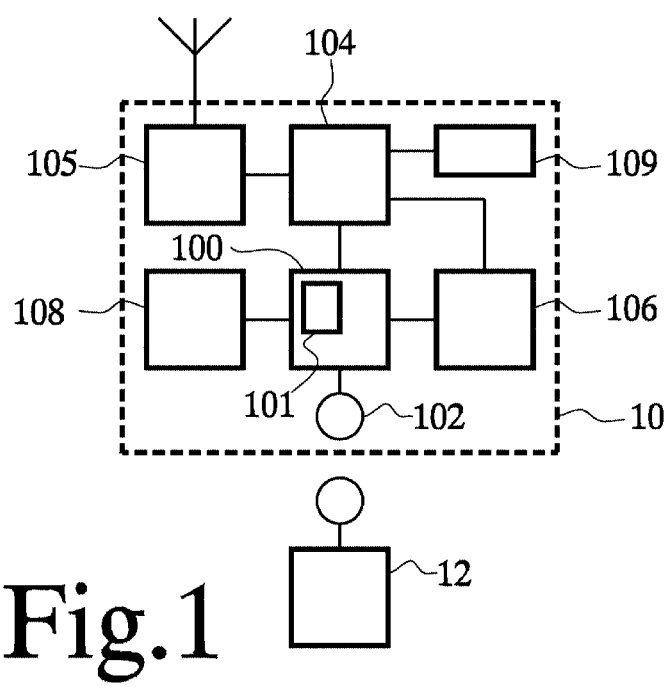

(51) Int. Cl.
*H04W 24/00* (2009.01)
*H04W 76/02* (2009.01)
*H04W 84/10* (2009.01)
*H04W 88/02* (2009.01)

(56) References Cited

U.S. PATENT DOCUMENTS

| | | | |
|---|---|---|---|
| 8,219,028 B1* | 7/2012 | Flamholz | 455/41.2 |
| 8,249,935 B1* | 8/2012 | DiMartino et al. | 705/16 |
| 8,432,293 B2* | 4/2013 | Symons | 340/854.8 |
| 8,594,563 B2* | 11/2013 | Waters et al. | 455/41.1 |
| 8,706,588 B1* | 4/2014 | Zhu | 705/35 |
| 8,893,234 B2* | 11/2014 | Morel et al. | 726/4 |
| 2002/0032601 A1* | 3/2002 | Admasu et al. | 705/13 |
| 2003/0218532 A1* | 11/2003 | Hussmann | 340/5.8 |
| 2004/0005911 A1* | 1/2004 | Guirauton et al. | 455/558 |
| 2006/0226951 A1* | 10/2006 | Aull et al. | 340/5.61 |
| 2007/0123305 A1* | 5/2007 | Chen et al. | 455/558 |
| 2008/0014867 A1* | 1/2008 | Finn | 455/41.1 |
| 2008/0081611 A1* | 4/2008 | Hoyt et al. | 455/425 |
| 2008/0085001 A1* | 4/2008 | Charrat et al. | 380/247 |
| 2008/0201212 A1* | 8/2008 | Hammad et al. | 705/13 |
| 2008/0293397 A1* | 11/2008 | Gajdos et al. | 455/420 |
| 2008/0320587 A1 | 12/2008 | Vauclair et al. | |
| 2009/0093272 A1* | 4/2009 | Saarisalo et al. | 455/558 |
| 2009/0137219 A1* | 5/2009 | Williams | 455/214 |
| 2009/0312011 A1* | 12/2009 | Huomo et al. | 455/426.1 |
| 2010/0009627 A1* | 1/2010 | Huomo | 455/41.1 |
| 2010/0042954 A1* | 2/2010 | Rosenblatt et al. | 715/863 |
| 2010/0081374 A1* | 4/2010 | Moosavi | 455/41.1 |
| 2010/0130176 A1* | 5/2010 | Wan et al. | 455/414.1 |
| 2010/0211507 A1* | 8/2010 | Aabye et al. | 705/71 |
| 2010/0217710 A1* | 8/2010 | Fujita | 705/71 |
| 2010/0264211 A1* | 10/2010 | Jain et al. | 235/380 |
| 2011/0035604 A1* | 2/2011 | Habraken | 713/193 |
| 2011/0171996 A1* | 7/2011 | Narendra et al. | 455/558 |

OTHER PUBLICATIONS

"Smart Cards; UICC—Contactless Front'End (CLF) Interface; Host Controlelr Itnerface (HCI), Release 7, ETSI TS 102 622", ETSI Standard, European Telecommunications Standards Institute, Sophia, Antipolis Cedex, FR, vol. SCP-6, No. V7.2.0 (Sep. 1, 2008).
GSMA; "Mobile NFC Technical Guidelines—Version 2.0", Internet Citiation http://www.gsmworld.com/documents/nfc/gsma_nfc2_wp.pdf (Nov. 1, 2007).
International Search Report for Application PCT/IB2009/055135 (Aug. 10, 2010).

* cited by examiner

PORTABLE MOBILE COMMUNICATION DEVICE AND METHOD OF CONTROLLING NEAR FIELD COMMUNICATION

FIELD OF THE INVENTION

The invention relates to a portable mobile communication device, to a near field communication circuit for use in such a communication device and to a method of operating near field communication with a mobile communication device.

BACKGROUND OF THE INVENTION

WO2007/052994 describes a mobile telephone with a near field communication circuit (NFC-IC). Basic mobile telephone operation involves communication with base stations. An additional near field communication circuit in the mobile telephone enables the mobile telephone to interact locally with equipment like ticket selling machines or payment machines in the proximity of the mobile telephone. The mobile telephone may emulate a smart card for example, the near field communication circuit receiving power from the field of a card reader, to access a secure memory in the mobile telephone.

WO2007/052994 describes that the mobile telephone comprises a host processor coupled to the near field communication circuit using a standardized host communication interface (HCI). This interface enables the host processor to write commands to the near field communication circuit and to read data and configuration information from the near field communication circuit.

In mobile telephones the subscriber identification module (SIM card) may act as host for the near field communication circuit. In communication with the near field communication circuit, the SIM card sets up configuration data to define communication pipe states and handles. This type of configuration information is stored in a non-volatile memory in the near field communication circuit, to enable the near field communication circuit to operate independently under power from the field of a card reader. This introduces the risk of errors when the SIM card is exchanged. To prevent such errors, SIM cards and near field communication circuits operate on a session basis, with sessions defined by a "session id" number stored in the SIM card and near field communication circuit. The "session id" can be a randomly selected number. The SIM card tests whether the session id numbers match as a condition before starting cooperation with the near field communication circuit. Thus, it is prevented that replacement of the SIM card can lead to errors.

Increasingly, mobile communication equipment is equipment with a plurality of host processors. For example, in addition to a host in the exchangeable SIM card there may be a mobile host processor permanently installed in the mobile communication equipment (e.g. soldered to a substrate). Such a mobile host processor may be used to perform complicated control functions. Frequently, it is used as a supervisor that determines the extent to which other host processors are allowed to access the near field communication circuit or secure memories. Thus, it enables the user to control whether the mobile communication device can be used to make payments or not. Similarly, it may enable the user to control the ability to communicate directly with other mobile telephones.

Mobile host processors of portable communication devices suffer from frequent power down situations. Battery removal, user switch off and battery energy saving may all lead to frequent removal of power from the mobile host processor. Each time when power is switched on, communication with the near field communication circuit requires setting up a new configuration, which may introduce errors in the interaction between the near field communication circuit and other hosts or secure memory. Also, because the near field communication circuit stores configuration data in non-volatile memory, frequent mobile host power downs may reduce the useful lifetime of the near field communication circuit due to excessive wear of the non-volatile memory.

SUMMARY OF THE INVENTION

Among others, it is an object to provide for a portable mobile communication device with a near field communication circuit and a plurality of host processors, wherein control by a host processor involves less reconfiguration.

A portable mobile communication device according to claim 1 is provided. This device comprises its own permanently installed (e.g. soldered) mobile host processor. Prior to using a communication channel to the near field communication circuit of the portable mobile communication device, the mobile host processor causes a session identity value from the non-volatile memory of the near field communication to be tested by comparing it with a reference value. If the reference value and the session identity value do not match, a new set up of configuration data for the communication channel is performed. Afterwards session identity value and/or the reference value are changed so that they will match. In an embodiment the reference value and the session identity value are made unequal when the communication channel is de-established.

In this way it is made possible to use previously established pipes for the communication with the mobile host processor in a reliable way. Configuration information can be reused reliably even if the mobile host processor has been powered down since the establishment of the pipes and without requiring rewriting of the configuration data each time when mobile host processor is powered up again. Autonomous operation of the near field communication circuit, for example supplied by RF power from a reader that is not used to activate the mobile host processor, is made possible without affecting reliability.

In an example, the session identity value may be a value that is used by subscriber identification module (SIM card) to test whether it has been moved to a different portable mobile communication device. In this way no additional session identity information is needed. In a further embodiment the session identity value may be changed before setting up the configuration data. This prevents intervening use of the near field communication device by the SIM card. The session identity value may be changed back to its original value after setting up the configuration data and to set the reference value to match said original value. Thus, the SIM card is re-enabled after the establishment of the communication channel.

In an embodiment the non-volatile memory of the near field communication device may be used to supply the reference value and/or configuration data for communication pipes to the mobile host processor. In this case no, or at least less, non-volatile memory is needed for the local host processor itself.

BRIEF DESCRIPTION OF THE EMBODIMENTS

These and other objects and advantages will become apparent from a description of exemplary embodiments, using the following Figures.

Figure 2:
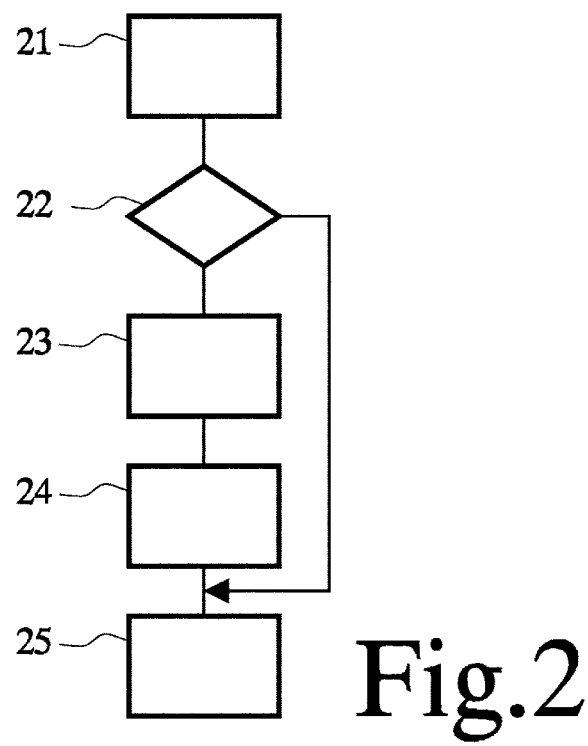

FIG. 1 shows a mobile communications system
FIG. 2 shows a control flow-chart

DETAILED DESCRIPTION OF THE EMBODIMENTS

FIG. 1 shows an environment wherein a portable mobile communication device 10 is used. This environment comprises portable mobile communication device 10 and a reader 12. Mobile communication device 10 is configured to operate both as a terminal of a mobile telecommunications network (not shown), e.g. as a mobile telephone) and as a device in local bi-lateral communication with reader 12.

An embodiment of portable mobile communication device 10 is shown that comprises a near field communication circuit 100, an antenna 102, a mobile host processor 104, a mobile telecommunications transceiver 105, a subscriber identification module 106, a secure memory 108 and a non-volatile memory. Antenna 102 is coupled to near field communication circuit 100. Near field communication circuit 100 has processor interfaces coupled to mobile host processor 104, subscriber identification module 106 and secure memory 108. Near field communication circuit 100 comprises a further non-volatile memory 101, for example an EEPROM circuit. In the illustrated embodiment mobile host processor 104 is functionally coupled to non-volatile memory 109, to subscriber identification module 106 and mobile telecommunications transceiver 105. Mobile telecommunications transceiver 105 is coupled to antenna for communication with a base station (not shown).

Reader 12 may be provided with a coil to generate a local RF electromagnetic field to interrogate a device in its neighborhood. This may be used in a smart card reader for example, mobile communication device 10 simulating a smart card. Reader 12 may be part of another device, such as another mobile telephone with an NFC interface, a peripheral connected to a payment system, a peripheral of a computer etc.

Near field communication circuit 100 may be suitable for use in a battery-less operation mode of mobile communication device 10, i.e. operation wherein the circuit receives at least part of its power supply from the electromagnetic field provided by reader 12 instead of from a battery of the mobile communication device. Interrogation by reader 12 may be used to exchange messages with near field communication circuit 100. Such messages may be used for example in access control, portable mobile communication device 10 acting as an electronic key, or to perform electronic payments, portable mobile communication device 10 acting like a debit card, or to share information etc. Near field communication circuit 100 may execute a transaction involving communication with reader 12, exchanging messages using antenna 102, for example reading and/or updating data in secure memory 108.

In operation only part of portable mobile communication device 10 need be active during the communication with reader 12. Full mobile telephone functionality may not be needed for this communication. Thus for example, only near field communication circuit 100 may be active, mobile host processor 104, subscriber identification module 106, secure memory 108 receiving no power supply, or only selected ones of mobile host processor 104, subscriber identification module 106 and secure memory 108 may be active.

Near field communication circuit 100 may also be configured to act as a reader itself, or both to act as a reader and as a device read by a reader. When near field communication circuit 100 is configured to act as reader, reader 12 may be replaced by another device that responds to near field communication circuit 100 when it acts as a reader. Instead of an RF electromagnetic field any other communication medium may be used, such as an infrared signal etc.

Near field communication circuit 100 may be implemented as a single integrated circuit. As used herein the term near field communication circuit 100 refers at least to that part of portable mobile communication device 10 that must be active to exchange signals with reader 12 or a device being read and to convert the signals into digital data that can be handled by the other circuits. In an embodiment near field communication circuit 100 consists of all circuits that are able to function when power is supplied in a power supply domain that is activated by reader 12. In practical terms near field communication circuit 100 may be an integrated circuit that is able to operate in this way.

Mobile host processor 104 may be used as a privileged controller of near field communication circuit 100, activated for example in modes where power is made available to more than just near field communication circuit 100. As a privileged controller mobile host processor 104 causes near field communication circuit 100 to set enablement information in its non-volatile memory 101 to enable or disable operations to be performed wherein mobile host processor 104 is not directly involved. This may be the case when near field communication circuit 100 interacts with reader 12, or when it is controlled by another host processor, such as a host processor in subscriber identification module 106 or secure memory 108. Mobile host processor 104 may also be used to control selected operations of near field communication circuit 100.

Communication between a host processor such as mobile host processor 104 and near field communication circuit 100 involves use of various configuration parameters. Communication with near field communication circuit 100 is modeled to proceed via one or more communication pipes, distinguished from each other by handles, which are data items that identify respective pipes. For each pipe configuration information may be provided, such as identifications of protocols to be used, pointers to buffers etc. When using a pipe, the host processor and the near field communication circuit 100 use the handles to identify the pipes to each other. Information defining the handles and optional other configuration data is stored in the non-volatile memory 101 of near field communication circuit 100 and in a non-volatile memory 109 that is directly accessible to the host processor.

In order to minimize power consumption portable mobile communication device 10 is capable of operating in modes of operation wherein part or all of its components do not receive battery power. In a normal operating mode at least near field communication circuit 100, mobile host processor 104 and subscriber identification module 105 receive supply power from a battery (not shown) of mobile communication device 10. In this mode, mobile communication device 10 may communicate with a base station (not shown) of a mobile telecommunication network.

In various power down modes power supply to all or part of near field communication circuit 100, mobile host processor 104 and subscriber identification module 106 may be cut off. Portable mobile communication device 10 may switch to such modes under control of a host processor, such as mobile host processor 104, when the host processor determines that a criterion for power saving is satisfied, but the switch may also be forced by battery condition or even complete removal of a battery.

This may influence the possibility of communication between near field communication circuit 100 and mobile host processor 104. In principle mobile host processor 104 could establish a configuration with new pipes temporarily each time when an interaction is needed, but this creates overhead and still risks interruption due to power down conditions. Instead mobile host processor 104 establishes a configuration with pipes that is designed to last through power down conditions. Between configuration changes configuration data for may be stored in non-volatile memory 101 of near field communication circuit 100. At least near field communication circuit 100 has access to this configuration data. A copy of this information may be stored in non-volatile memory 109 for direct access by mobile host processor 104. Measures are taken to ensure a minimal need to change the stored configuration data.

FIG. 2 shows a flow chart of steps executed by mobile host processor 104 when communication with near field communication circuit 100 is required. These steps may be defined by a program of instructions for mobile host processor 104. In a first step 21 mobile host processor 104 reads a session identity value from near field communication circuit 100. In a second step 22 mobile host processor 104 compares the session identity value with a local reference value available to mobile host processor 104. If the session identity values do not match, mobile host processor 104 performs a third step 23 signaling near field communication circuit 100 to delete information that defines existing pipes, if any, that may still be partly or wholly unilaterally valid on the side of near field communication circuit 100 and to open new pipes, as needed by mobile host processor 104. In response, near field communication circuit 100 returns configuration data such as handles to mobile host processor 104, for use in future communication using the opened pipes.

Subsequently, in a fourth step 24, mobile host processor 104 stores the new handles and any other configuration information needed for communication with near field communication circuit 100 in a non-volatile memory 109 that is accessible to it. Also in fourth step 24 mobile host processor 104 sets the session identity information to a new value, matching the local reference value. In a fifth step 25 mobile host processor 104 starts exchanging signals with near field communication circuit 100, using the established pipes.

When mobile host processor 104 determines in second step 22 that the session identity value matches the local reference value, mobile host processor 104 proceeds immediately to fifth step 25, avoiding deletion and replacement of information that defines existing pipes.

In an embodiment the local reference value may be a fixed default value. In this case, near field communication circuit 100 may be installed with another value as session identity value and the default value may be defined in the program of mobile host processor 104. In another embodiment a variable local reference value may be used, which may be stored in a non volatile memory 109, mobile host processor 104 reading the local reference value from that memory for use in the comparison. In this embodiment, alternatively the local reference value may be changed in fourth step 24, to make it equal to the stored session identity value. Optionally both the local reference value and the stored session identity value may be changed to make them equal. Instead of using the non-volatile memory 109 external to the near field communication circuit 100 to store the reference value, the reference value may be stored in the non-volatile memory circuit 101 of the near field communication circuit 100, in parallel with the session identity value. In this case, mobile host processor 104 may retrieve both the session identity value and the reference value from non-volatile memory circuit 101 for use in the comparison. Thus less independent non-volatile memory is needed.

In an embodiment mobile host processor 104 is programmed to execute the steps of the flow-chart in response to a power up condition or after receiving a reset signal. In these cases fifth step 25 may be delayed until conditions arise that require communication with near field communication circuit 100. In another embodiment mobile host processor 104 is programmed to execute the steps of the flow-chart when conditions arise that require communication with near field communication circuit 100. Thus, initialization will be performed before such communication if the session identity value does not match.

In a further embodiment mobile host processor 104 may use steps to realize an intermediate change of a session identity value while configuration data is set up. In this embodiment, a first additional step is added between second step 22 and third step 23, wherein mobile host processor 104 signals near field communication circuit 100 to change session identity information. The session identity information may be changed for example to a predetermined value that has been allocated to indicate that initialization is in progress, Mobile host processor 104 performs a second additional step between fourth step 24 and fifth step 25, wherein mobile host processor 104 signals near field communication circuit 100 to change its session identity information to another value. A predetermined value may be used for example, allocated to indicate successful initialization.

In another embodiment the session identity value may be set back to its original value in fifth step, as read by mobile host processor 104 in first step 21. The additional steps have the effect that session identity bases transactions with near field communication circuit 100 are disabled while third step 23 and fourth step 24 are executed. This makes the device more robust against sudden power downs or resets.

As is known per se, subscriber identification module 106 may store session identity information for comparison with session identity information in near field communication circuit 100. In known devices this is used prevent communication between subscriber identification module 106 and near field communication circuit 100 when subscriber identification module 106 (the SIM card) has been exchanged. Further independent session identity information may be stored in near field communication circuit 100 for further hosts. Alternatively, although this is not standard, common session identity information may be used for a plurality of hosts.

When mobile host processor 104 de-establishes the pipes for any reason, undoing the effect of third step 23, this may have the effect that privileges for other hosts are changed at least temporarily. The changed privileges can lead to errors, for example if a transaction is initialized between subscriber identification module 106 and near field communication circuit 100. In a further embodiment the mobile host processor 104 and or the near field communication circuit 100 may be configured to inform subscriber identification module 106 and/or other hosts that the earlier configuration of the host may no longer be valid and that it should also request permission again, preferably by re-initialization.

In an embodiment this is done by change the session identity information for subscriber identification module 106 and/or the other hosts in near field communication circuit 100. In this embodiment mobile host processor 104 may use the first and second additional steps to change the session identity information in near field communication circuit 100 that is used at least for the subscriber identification module 106 at the start of initialization and to change it back on completion of initialization. Thus disturbance of initialization by unexpected activity of the subscriber identification module 106 is prevented. In a further embodiment, the session identity information is changed for all hosts on start and completion of initialization. However, for hosts that cannot become unpredictably active this may be superfluous. Even if a status flag is used instead of the session identity value to determine whether a set up of configuration data is needed or to force such a set up, a change of the session identification information for the identification module 106 and/or for other hosts may be used to prevent disturbance of initialization by unexpected activity of the subscriber identification module 106.

During re-initialization period it is preferably ensured that other hosts (such as the SIM card) cannot trigger a non-permitted operations and/or produce an erroneous transaction. In an embodiment, session identity information and the local reference value are also made unequal before de-establishing the pipes. This ensures that interruptions during de-establishing cannot affect later re-initialization.

In an embodiment the session identity value and the reference value are matched by determining whether they are bitwise equal to each other. But it should be appreciated that matching may rely on verifying any relation between the two. For example matching may involve testing whether session identity value and the reference value are each others' bitwise inverse. In this case the updates to session identity value and reference value are made by using a value that satisfies the relevant relation or not, dependent on whether matching or non-matching values are required.

Although an embodiment has been shown wherein mobile host processor 104 uses the session identity information from near field communication circuit 100, it should be appreciated that alternatively additional other information may be used in the process of FIG. 2, instead of the session identity information. In this case the other information may be stored in both non-volatile memory 109 and non-volatile memory 101. Instead of information in non-volatile memory 109 information in the program of mobile host processor 104 may be used. Near field communication circuit 100 is configured to update the other information upon receiving a command to do so from mobile host processor 104. However, using the session identity information instead of other information has the advantage that no additional information exchange command types need to be supported by near field communication circuit 100 and that blocking of other communication with near field communication circuit 100 is made easier.

In a further embodiment mobile host processor 104 may also retrieve at least part of the configuration data from near field communication circuit 100 on power up. Thus, less information needs to be stored in a non volatile way that is directly accessible for mobile host processor 104. After retrieval mobile host processor 104 may store the information in a volatile memory in mobile host processor 104, for example in registers (not shown). To support this, near field communication circuit 100 may be configured to support handling commands from mobile host processor 104 to retrieve and return the configuration data.

In an embodiment mobile host processor 104 may us a session identity value and a local reference value that are both stored in the non-volatile memory of near field communication circuit 100. To support this near field communication circuit 100 may be configured to support handling of commands to retrieve these values. Thus, less information needs to be stored in a non volatile way that is directly accessible for mobile host processor 104. When both the local reference value and the configuration data are retrieved from near field communication circuit 100, no non-volatile memory is needed for mobile host processor 104 at all for configuring communication with near field communication circuit 100.

The described functions of mobile host processor 104 may be controlled by machine instructions from software modules of a control program of mobile host processor 104. These software modules may include an initialization module to cause mobile host processor 104 to perform the steps of the flow chart of FIG. 2, a module to communicate with near field communication circuit 100 via the pipes using the configuration parameters, a module to send commands to near field communication circuit 100 and receive back results, a module to the change session identity value and a module to set-up configuration data. Alternatively, part or all of these modules may be implemented as dedicated circuits wired to perform these functions.

Although mobile host processor 104 may perform the comparison between the session identity information and the reference value with the same processor core as all other mobile host processor operations, it should be appreciated that alternatively different cores may be used. Thus, one processor core may send a request to another processor core to compare the session identity information and the reference value. Similarly, one processor core may send a request to another processor core to change the session identity information and/or the reference value.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A portable mobile communication device, comprising:
a near field communication circuit comprising a non-volatile memory and a processor interface, the near field communication circuit being configured to execute communication operations via the processor interface dependent on configuration data stored in the non-volatile memory;
a mobile host processor permanently installed in the portable mobile communication device, coupled to said processor interface, the mobile host processor comprising an initialization module configured to
cause a session identity value stored in the non-volatile memory to be tested before using a communication channel via the said processor interface,
trigger set up of the configuration data for the communication channel if the session identity value does not match a reference value and
cause the session identity value and/or the reference value to be changed so that they match, at least after setting up the configuration data.

2. A portable mobile communication device according to claim 1, wherein the mobile host processor comprises a de-initialization module configured to cause the session identity value and the reference value to be made unequal when the communication channel is de-established.

3. A portable mobile communication device according to claim 2, wherein the mobile host processor is configured to make the session identity value and the reference value unequal by changing the session identity value in the non-volatile memory of the near field communication device.

4. A portable mobile communication device according to claim 1, comprising a mobile telecommunications circuit comprising a subscriber identification module, wherein the mobile host processor is configured to block operations involving the subscriber identification module and the near field communication circuit during the set up of the configuration data.

5. A portable mobile communication device according to claim 4 wherein the near field communication circuit is configured to store a subscriber identification module session identity value for use by the subscriber identification module to enable the operations, the mobile host processor being configured to change the subscriber identification module session identity value in the non-volatile memory before setting up the configuration data.

6. A portable mobile communication device according to claim 5 wherein the initialization module is configured to change the subscriber identification module session identity value back after setting up the configuration data, to its original value that pertained before said changing.

7. A portable mobile communication device according to claim 1, wherein the near field communication circuit is configured to control operations that do not involve direct communication with the mobile host processor, the near field communication circuit being configured to control said operations dependent on enablement information from the non-volatile memory, the mobile host processor being configured to set the enablement information via said communication channel.

8. A portable mobile communication device according to claim 1, wherein the near field communication circuit is configured to perform said operations while said mobile host processor is in a power down mode.

9. A portable mobile communication device according to claim 1, wherein the non-volatile memory of the near field communication device comprises a storage location for the reference value, and the near field communication circuit is configured to return said reference value in response to a command from the mobile host processor, and the mobile host processor is configured to obtain the reference value by issuing said command, before testing the session identity value.

10. A portable mobile communication device according to claim 1, wherein the non-volatile memory of the near field communication device comprises a storage location for storing the configuration data needed by the mobile host processor to operate the communication channel, the near field communication circuit being configured to return the configuration data in response to a command from the mobile host processor.

11. A method of controlling near field communication with a portable mobile communication device, the device comprising a mobile host processor permanently installed in the portable mobile communication device and a near field communication circuit comprising a non-volatile memory, the method comprising:
  maintaining the configuration data in the non-volatile memory of the near field communication circuit, for control of communication dependent on the configuration data;
  testing a session identity value, prior to communication between the near field communication circuit and the mobile host processor,
  if the session identity value does not match a reference value, setting up at least part of the configuration data for a communication channel, and
  equalizing the session identity value and the reference value after setting up the configuration data; and
  proceeding with communication between the near field communication circuit and the mobile host processor without said setting up if the session identity value matches the reference value, and after said setting up and equalizing steps if the session identity value does not match the reference value.

12. A portable mobile communication device, comprising:
  a subscriber identification module,
  a near field communication circuit comprising a non-volatile memory and a processor interface, the near field communication circuit being configured to execute communication operations via the processor interface dependent on configuration data stored in the non-volatile memory, the near field communication circuit configured to store a subscriber identification module session identity value for use by the subscriber identification module to enable operations involving the subscriber identification module and the near field communication circuit;
  a mobile host processor permanently installed in the portable mobile communication device, coupled to said processor interface, the mobile host processor comprising a configuration module configured to block the operations involving the subscriber identification module and the near field communication circuit during the set up of configuration data by changing the subscriber identification module session identity value in the non-volatile memory before setting up the configuration data.

13. A portable mobile communication device according to claim 12, wherein the configuration module is configured to change the subscriber identification module session identity value back after setting up the configuration data, to its original value that pertained before said changing.

14. A method of controlling near field communication with a portable mobile communication device, the device comprising a mobile host processor permanently installed in the portable mobile communication device, a subscriber identification module and a near field communication circuit comprising a non-volatile memory, the method comprising:
  enabling operations involving the subscriber identification module and the near field communication circuit dependent on tests of subscriber identification module session identity value in the non-volatile memory of the near field communication circuit;
  maintaining the configuration data in the non-volatile memory of the near field communication circuit, for control of communication dependent on the configuration data;
  blocking said operations during the set up of the configuration data, by changing the subscriber identification module session identity value in the non-volatile memory before setting up the configuration data.

* * * * *